United States Patent
El-Hanany et al.

(10) Patent No.: US 7,525,098 B2
(45) Date of Patent: Apr. 28, 2009

(54) HIGH RESOLUTION ENERGY DETECTOR (75) Inventors: Uri El-Hanany, Rehovot (IL); Arie Shahar, Moshav Magshimim (IL); Alex Tsigelman, Petah Tikva (IL)

(73) Assignee: Orbotech Ltd., Yavne (IL)

( * ) Notice: Subject to any disclaimer, the term of this patent is extended or adjusted under 35 U.S.C. 154(b) by 7 days.

(21) Appl. No.: 11/729,141

(22) Filed: Mar. 28, 2007

(65) Prior Publication Data
US 2007/0295914 A1 Dec. 27, 2007

Related U.S. Application Data

(60) Provisional application No. 60/789,738, filed on Apr. 5, 2006.

(51) Int. Cl.
*H01L 27/00* (2006.01)
(52) U.S. Cl. .............. 250/370.1; 250/370.06; 250/370.14
(58) Field of Classification Search .............. None
See application file for complete search history.

(56) References Cited

U.S. PATENT DOCUMENTS 6,528,795 B2 * 3/2003 Kurfess et al. ........... 250/370.1
6,732,059 B2 * 5/2004 Warburton et al. ............ 702/78
2003/0010924 A1 * 1/2003 El-Hanany et al. ..... 250/370.09
2007/0235657 A1 * 10/2007 He et al. ...................... 250/389

OTHER PUBLICATIONS

"Germanium strip detector compton telescope using three dimensional readout", by Wulf, et al., published in IEEE Trans. Nuc. Sci., 2003.

* cited by examiner

*Primary Examiner*—David P Porta
*Assistant Examiner*—Yara B Green
(74) *Attorney, Agent, or Firm*—Ladas and Parry LLP (57) ABSTRACT

Apparatus for detecting radiation, including a semiconductor which is arranged to interact with photons of the radiation, and a plurality of electrodes which are configured to sense respective charge distributions in response to interactions of the photons with a region of the semiconductor. The apparatus includes circuitry having respective detector circuits coupled to the electrodes to detect the interactions. The circuitry is configured to receive the respective charge distributions from two or more of the electrodes so as to generate respective energy distributions of the photons for each of the two or more electrodes, to compensate for variations in detection characteristics of the respective detector circuits so as to align the respective energy distributions with each other to form aligned distributions, to sum the aligned distributions to generate an overall energy distribution of the photons, and to output a signal indicative of the overall energy distribution.

20 Claims, 6 Drawing Sheets

| CHANNEL ADDRESS $A_S$ | CHANNEL GAIN $A_{SG}$ | CHANNEL OFFSET $A_{SO}$ |
|---|---|---|
| 001 | 011 | 003 |
| 100 | 012 | 004 |
| 200 | 010 | 002 |
| 1024 | 009 | 005 |

HIGH RESOLUTION ENERGY DETECTOR

CROSS-REFERENCE TO RELATED APPLICATION

This application claims the benefit of U.S. Provisional Patent Application 60/789,738, filed 5 Apr., 2006, which is incorporated herein by reference.

FIELD OF THE INVENTION

The present invention relates generally to detection of high energy radiation, and specifically to high resolution high energy detection.

BACKGROUND OF THE INVENTION

Radiation detectors, such as solid state radiation detectors, may be used to determine the γ-ray spectrum of a radioactive body. Typically, the measured spectrum differs from the actual emitted γ-ray spectrum because of scattering, typically Compton scattering, of the γ-Bray photons. The scattering causes the radiation detector to act inefficiently.

SUMMARY OF THE INVENTION

In an embodiment of the present invention, a radiation detector assembly comprises a plurality of electrodes coupled to a semiconductor. The electrodes, also herein termed detector elements, are configured to sense charge distributions that are generated by interactions, such as Compton scattering and/or photoelectric absorption, of incoming photons with the semiconductor. The detector elements are coupled to circuitry which, for each incoming photon, is configured to receive the charge distributions generated by the photon interacting with the semiconductor. From the charge distributions the circuitry determines an energy of the photon and the detector element in proximity to which the photon first interacted with the semiconductor. For multiple photons, the circuitry generates respective energy distributions for the detector elements.

The respective energy distributions are typically misaligned with each other because the detector elements, and respective detector circuits of the circuitry associated with the elements, have different properties. The circuitry is configured to compensate for variations in the properties so as to align the respective energy distributions and to sum the aligned distributions so as to generate an overall energy distribution of the multiple photons. The process of alignment effectively formulates the overall energy distribution for the whole, typically relatively large, assembly to have an energy resolution substantially equal to that of a single detector element.

Typically, the radiation detector assembly is formed by stacking a multiplicity of substantially similar detector arrays together. Each detector array may be formed from a planar semiconducting plate. A two-dimensional array of detector elements, configured to act as anodes, is coupled to and substantially covers one side of the plate. A single detector element, configured to act as a cathode, is coupled to and substantially covers the other side of the plate.

In some embodiments of the present invention, the circuitry is configured to analyze the interactions of a single photon so as to determine, in addition to the energy of the photon, an orientation of the photon. The orientation is generated as the angle of a cone upon which the photon lies.

There is therefore provided, according to an embodiment of the present invention, apparatus for detecting radiation, including:

a semiconductor which is arranged to interact with photons of the radiation;

a plurality of electrodes, coupled to the semiconductor in different respective locations, which are configured to sense respective charge distributions in response to interactions of the photons with a region of the semiconductor in proximity to the respective locations; and circuitry including respective detector circuits coupled to the electrodes so as to detect the interactions, the circuitry being configured, on detection thereof, to receive the respective charge distributions from two or more of the electrodes so as to generate respective energy distributions of the photons for each of the two or more electrodes, to compensate for variations in detection characteristics of the respective detector circuits so as to align the respective energy distributions with each other to form aligned distributions, to sum the aligned distributions to generate an overall energy distribution of the photons, and to output a signal indicative of the overall energy distribution.

Typically the circuitry is arranged to detect, for a given photon included in the photons, a group of the interactions generated by the given photon and occurring at one interaction time. The two or more electrodes may be configured as anodes, at least one other of the electrodes may be configured as a cathode, and the circuitry may be configured to detect the respective charge distributions of the group from the two or more electrodes after receipt of a trigger signal generated at the cathode in response to the group of the interactions.

The semiconductor is typically configured as a plate having a first side and a second side opposite the first side, wherein the at least one other of the electrodes includes one electrode located on the first side, and wherein the two or more electrodes are located on the second side. In an embodiment the two or more electrodes are arranged in a two-dimensional matrix, and the two-dimensional matrix and the one electrode may have equal surface areas.

In a disclosed embodiment the circuitry is configured to read the two or more electrodes after receipt of the trigger signal during a detection time period that is set in response to a ratio of an area of the cathode to an area of one of the anodes.

In some embodiments the circuitry is configured to determine respective energies dissipated in the interactions of the group, and to sum the energies to provide an energy of the given photon. Alternatively or additionally, the circuitry may be configured to determine an initial interaction of the group, and to select one of the electrodes in response to a location of the initial interaction. Further alternatively or additionally, the circuitry may be coupled to determine an orientation angle for the given photon measured with respect to the semiconductor, in response to respective spatial parameters and respective energies of the interactions of the group.

In an alternative embodiment the circuitry includes a memory wherein are stored respective alignment parameters for each of the respective detector circuits, wherein the respective alignment parameters are determined in response to irradiation of the semiconductor with a known radiation source, and wherein the circuitry is configured compensate for the variations in the detection characteristics of the respective detector circuits in response to the respective alignment parameters.

In some embodiments the circuitry is configured so that an energy resolution of the signal is equal to a resolution of one of the energy distributions.

In an alternative disclosed embodiment the semiconductor is configured as a multiplicity of plates, and the plates are arranged in a stack. Each of the plates may include a first side and a second side opposite the first side, the first side having a cathode located thereupon, the second side having an array of anodes located thereupon, the cathode and the array of anodes being selected from the plurality of electrodes, the plates are typically arranged within the stack to face one direction.

There is further provided, according to an embodiment of the present invention, apparatus for detecting radiation, including:

a semiconductor which is arranged to interact with a photon of the radiation;

a plurality of electrodes, coupled to the semiconductor in different respective locations, which are configured to sense respective charge distributions in response to an interaction of the photon with a region of the semiconductor in proximity to the respective locations; and circuitry which is coupled to the electrodes so as to detect the interaction, and, on detection thereof, to receive the respective charge distributions from two or more of the electrodes, to determine respective interaction energies in response to the respective charge distributions, to sum the respective interaction energies to determine an energy of the photon, and to output a signal indicative of the energy.

Typically the interaction includes a group of interactions, and the circuitry is configured to determine an orientation angle for the photon measured with respect to the semiconductor, in response to respective spatial parameters and respective energies of the interactions of the group.

Alternatively or additionally the interaction includes a group of interactions, and the circuitry is configured to determine an initial interaction of the group, and to select one of the electrodes in response to a location of the initial interaction.

There is further provided, according to an embodiment of the present invention, a method for detecting radiation, including:

arranging a semiconductor to interact with photons of the radiation;

coupling a plurality of electrodes to the semiconductor in different respective locations;

configuring the plurality of electrodes to sense respective charge distributions in response to interactions of the photons with a region of the semiconductor in proximity to the respective locations; coupling respective detector circuits to the electrodes so as to detect the interactions;

receiving, on detection of the interactions, the respective charge distributions from two or more of the electrodes so as to generate respective energy distributions of the photons for each of the two or more electrodes;

compensating for variations in detection characteristics of the respective detector circuits so as to align the respective energy distributions with each other to form aligned distributions;

summing the aligned distributions to generate an overall energy distribution of the photons; and outputting a signal indicative of the overall energy distribution.

The method may include detecting, for a given photon included in the photons, a group of the interactions generated by the given photon and occurring at one interaction time.

There is further provided, according to an embodiment of the present invention, a method for detecting radiation, including:

arranging a semiconductor to interact with a photon of the radiation;

coupling a plurality of electrodes to the semiconductor in different respective locations;

configuring the plurality of electrodes to sense respective charge distributions in response to an interaction of the photon with a region of the semiconductor in proximity to the respective locations;

coupling circuitry to the electrodes so as to detect the interaction;

on detection of the interaction, receiving the respective charge distributions from two or more of the electrodes;

determining respective interaction energies in response to the respective charge distributions;

summing the respective interaction energies to determine an energy of the photon; and outputting a signal indicative of the energy.

The present invention will be more fully understood from the following detailed description of the embodiments thereof, taken together with the drawings in which:

DETAILED DESCRIPTION OF EMBODIMENTS

Figure 1A:
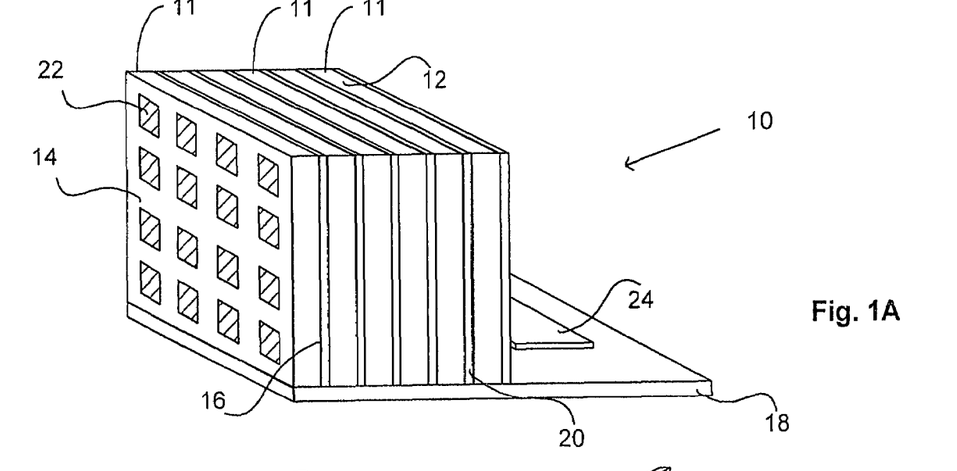
FIGS. 1A and 1B are schematic diagrams of a radiation detector assembly, according to an embodiment of the present invention.
Figure 1B:
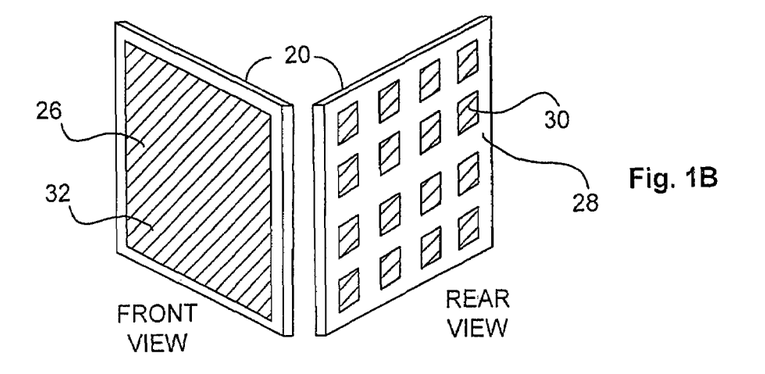
Figure 1C:
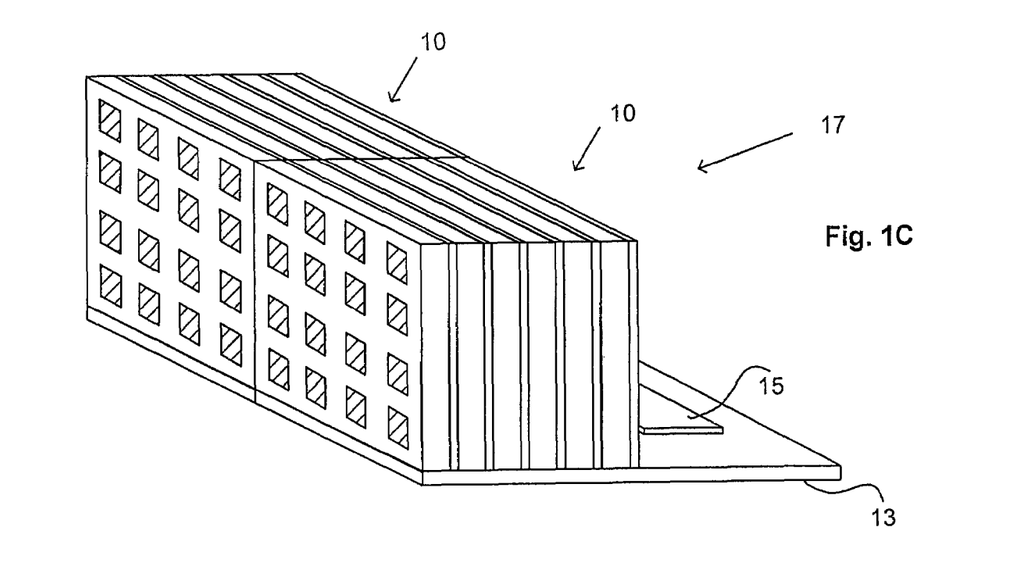
FIG. 1C is a schematic diagram of an alternative radiation detector assembly, according to an embodiment of the present invention.

Reference is now made to FIGS. 1A and 1B, which are schematic diagrams of a radiation detector assembly 10, and to FIG. 1C, which is a schematic diagram of an alternative radiation detector assembly 17, according to embodiments of the present invention. Assembly 10 comprises a multiplicity of substantially similar detector arrays 12, which are stacked together by being mounted on an array carrier board 18. Board 18 is typically formed from a printed circuit board (PCB). Each detector array 12 comprises a semiconductor in the form of a semiconducting plate 11. Plate 11 has a plurality of pixilated anodes 22 formed as a two-dimensional matrix on one side of the plate, and a common single cathode 16 formed on a second side of the plate. Anodes 22 and cathode 16 act as electrodes of plate 11. In a disclosed embodiment there are eight arrays 12, and each array comprises 256 anodes 22, but it will be understood that the scope of the present invention comprises arrays having any suitable number of anodes, and any suitable number of stacked arrays. For example, an alternative disclosed embodiment illustrated in FIG. 1A comprises six arrays, each having 16 anodes 22. As is described in more detail below, each anode of assembly 10 defines a channel within which charges generated on the anodes are measured, and wherein the measured values are transferred.

Plate 11 is typically formed from cadmium zinc telluride (CZT), although any other appropriate semiconductor, such as germanium, silicon, or a combination of silicon and germanium, may be used. The semiconducting material is selected so as to interact with photons of incoming radiation.

In the following description, similar elements of assembly 10 are differentiated from each other by having a letter suffix applied to an identifying numeral. Thus, arrays 12 comprise arrays 12A, 12B, . . . , which are formed from semiconducting plates 11A, 11B, . . . . As is illustrated in FIG. 1A, assembly 10 is in the form of a generally three-dimensional box-shaped structure, which is created by stacking generally two-dimensional arrays 12 so that the arrays face in the same direction. Thus, assembly 10 comprises a relatively large volume. In the disclosed embodiment referred to above, each array 12 is approximately 4 cm×4 cm×0.5 cm. In the alternative disclosed embodiment referred to above, each array is approximately 1 cm×1 cm×0.5 cm.

FIG. 1B shows a front view and a rear view of an insulated plate 20. Plate 20 has a monolithic contact 32 on its front side, and pixilated contacts 30 on its rear side. A plurality of plates 20 are mounted so as to separate arrays 12 from each other. The plates are mounted so that contact 32 aligns with, and contacts, single cathode 16, and so that contacts 30 align with and contact anodes 22. Plates 20 typically comprise electrical connections, not shown for clarity in FIGS. 1A and 1B, between contacts of the plates and board 18. The electrical connections provide, from board 18, bias voltages to the cathode and the anodes of each array 12, where the bias voltage to the anodes is higher than the one applied to the cathode. The electrical connections also transfer signals between the cathode and anodes and the board. Circuitry 24, typically an application specific integrated circuit (ASIC), may be mounted on board 18, and the circuitry is arranged to receive, via the board, signals from the cathodes and anodes of arrays 12. The circuitry is configured to process the received signals, as described in more detail below.

In addition to receiving and processing signals from the cathodes and anodes of arrays 12, circuitry 24 is configured to assign a unique address to each anode 22 in assembly 10. As described below, circuitry 24 uses the addresses as position locators for interactions registered by the anodes, and is able to analyze the interactions according to the positions at which they occur.

In some embodiments of the present invention a plurality of generally similar detector assemblies 10 are mounted together, typically on a single carrier board 13, which performs generally similar functions to those of board 18. Circuitry 15, generally similar to circuitry 24, is typically also mounted on board 13. An example of two assemblies 10 that are mounted together to form an enlarged radiation detector 17 is illustrated in FIG. 1C.

Figure 2A:
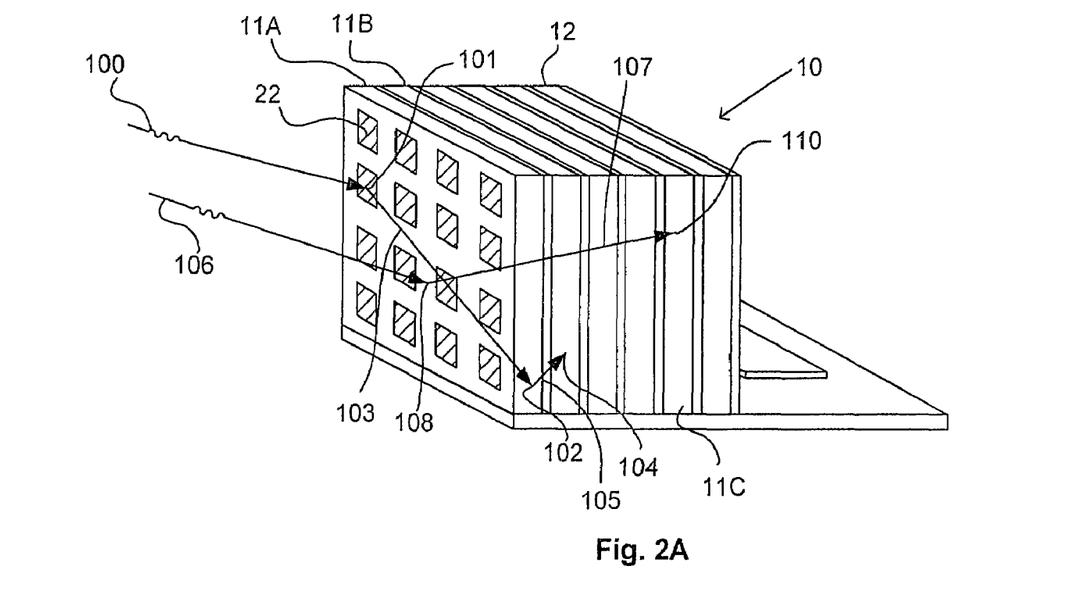
FIGS. 2A and 2B are schematic diagrams illustrating the operation of the radiation detector assemblies, according to an embodiment of the present invention.
Figure 2B:
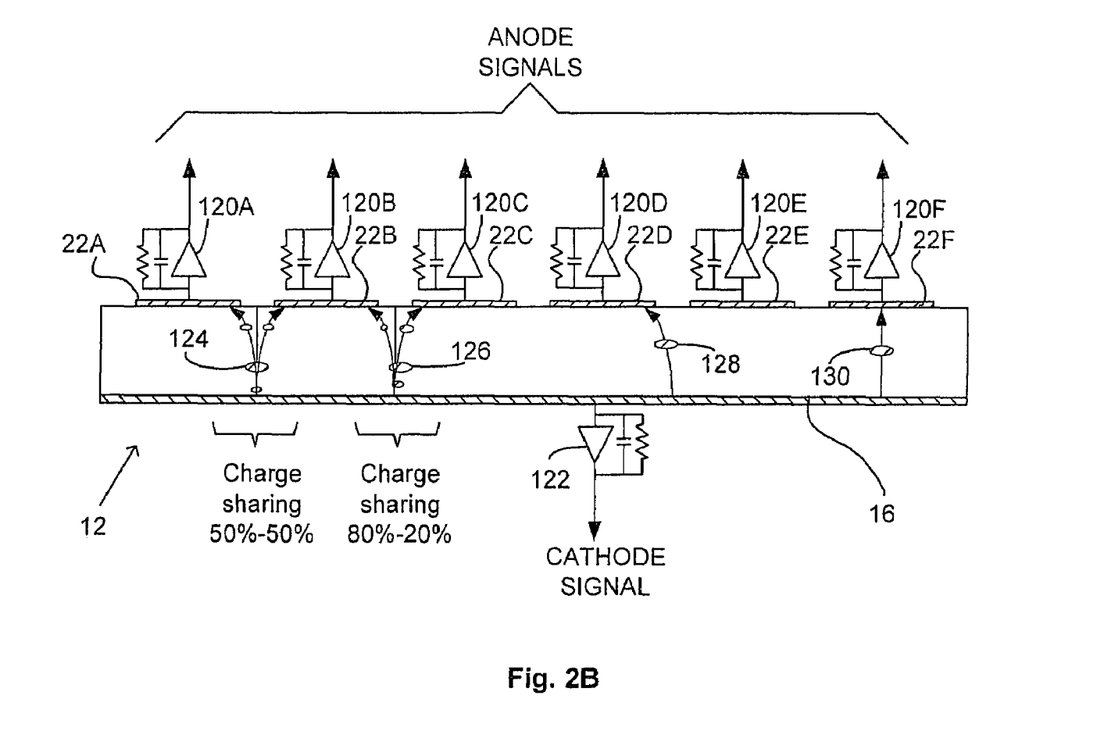

FIGS. 2A and 2B are schematic diagrams illustrating the operation of assembly 10, according to an embodiment of the present invention. As shown in FIG. 2A, an incoming photon 100 interacts with a first region 101 of plate 11A. The interaction is assumed to comprise a first Compton scattering of the photon along a path 103. The scattered photon is then assumed to undergo a second Compton scattering with a second region 102 of plate 11A to a path 105. Path 105 continues until the scattered photon is absorbed, in a region 104 of plate 11B.

Another incoming photon 106 is assumed to interact by Compton scattering with a region 108 of plate 11A. The scattering causes the photon to divert to a path 107, which continues until the photon is absorbed in a region 110 of plate 11C.

In the examples above, photon 100 undergoes three interactions with assembly 10, consisting of two Compton scatterings then absorption by the assembly. Photon 106 undergoes two interactions, consisting of one Compton scattering then absorption by assembly 10. The interactions of each photon effectively occur simultaneously, and the set of simultaneous interactions associated with a given photon are herein also termed the photon interaction group.

Each interaction in an interaction group, whether Compton scattering or absorption, initially generates an energetic electron at the site in the plate 11 where the interaction occurs. The energy imparted to the electron is from dissipation of photon energy by Compton scattering, or from annihilation of the photon, forming an electron—hole pair, in absorption. Each initial energetic electron in turn generates a cloud of electrons in the material of plate 11, and, as described below, assembly 10 measures the charge of the electron cloud and from this measurement an energy of the energetic electron may be determined. The energy of a given photon is proportional to the total charges of the electron-hole clouds generated by each interaction in the photon interaction group.

FIG. 2B is a cross-section of a part of a given array 12 showing anodes 22A, 22B, 22C, 22D, 22E, and 22F, and a cathode 16. Respective generally similar charge sensitive amplifiers (CSAs) 120A, 120B, 120C, 120D, 120E, and 120F are connected to each of the anodes. A CSA 122, generally similar to the CSAs connected to the anodes, is connected to cathode 16. In addition to operating as amplifiers, of the charge, on their respective electrodes, the CSAs act as charge integrators. The operation of the CSAs is described in more detail below with respect to FIG. 3 and FIG. 4. FIG. 2B also shows exemplary electron clouds 124, 126, 128, and 130 which are assumed to have been created by photon interactions similar to those described above. The electron clouds drift towards the positively charged anodes, the drift continuing until the electron clouds strike the anodes.

By way of example, electron cloud 124 is assumed to originate between anodes 22A and 22B, and to separate into two approximately equal clouds which terminate on anodes 22A and 22B. Electron cloud 126 is assumed to originate between anodes 22B and 22C, and to separate into two unequal clouds which terminate on anodes 22B and 22C. The separation of electron clouds 124 and 126, with consequent charge detection by more than one anode, is termed charge sharing. Electron cloud 128 is assumed to originate between anodes 22C and 22D, and to terminate on anode 22D. Electron cloud 130 is assumed to originate approximately in line with anode 22F, and to terminate on the anode.

The electron cloud drift causes charges to be generated on the anodes and the cathode, and the CSAs measure the charges generated.

Figure 3:
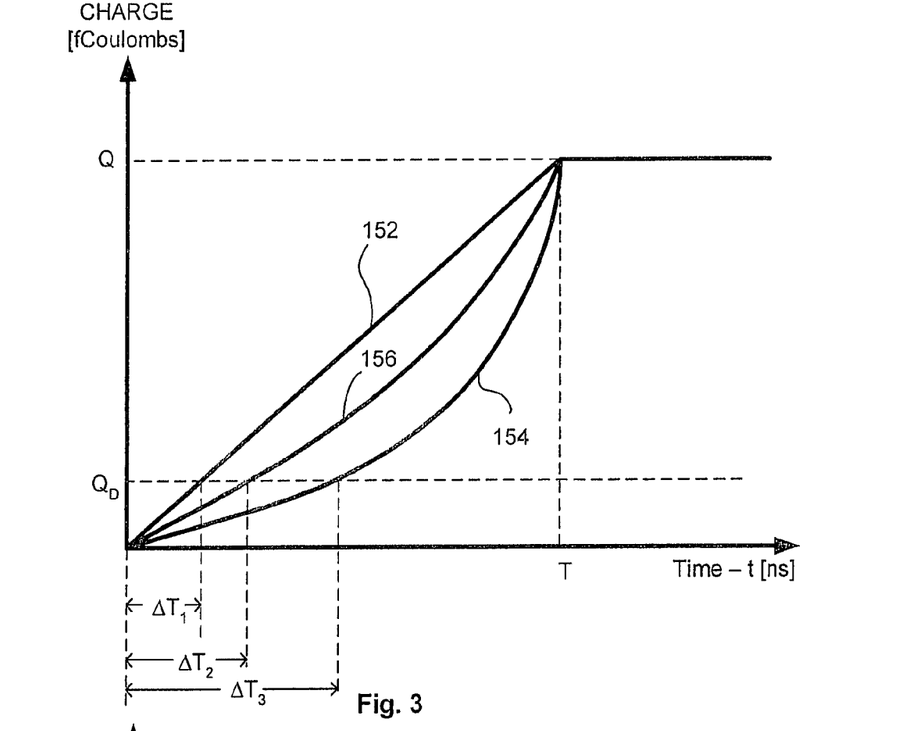
FIG. 3 shows schematic normalized graphs of charge vs. time, according to an embodiment of the present invention.

FIG. 3 shows schematic normalized graphs of charge vs. time, according to an embodiment of the present invention. A graph 152, also herein termed the cathode graph, shows the charge measured by CSA 122 (FIG. 2B) on cathode 16, as any one of electron clouds 124, 126, 128, or 130 drift towards anodes 22. The charge on the cathode increases with time until a time T, at which time the electron cloud strikes the anode. At time 0 the charge on the cathode is 0; at time T the value of the charge Q on the cathode corresponds to the charge on the electron cloud striking the anode. The relatively large area of the cathode determines that the increase of charge with time is substantially linear.

A graph 154 shows a typical charge vs. time relation for one of anodes 22. As for graph 152, the charge on any of the anodes is initially 0, and the final charge, at time T, is Q. However, the increase in charge on the anodes is not linear, and the non-linear effect is termed the small pixel effect. The small pixel effect is due to the relatively small area of anodes 22 compared to the area of cathode 16, causing induced charges on the anodes to be different from those on the cathode. The small pixel effect is manifested by the shape of graph 154 being concave upwards. The degree of concavity of graph 154 is related to an area of anodes 22, so that in general the greater the area of the anode, the smaller the concavity of the graph i.e., the closer the graph is to linear, and the less pronounced is the small pixel effect. Conversely, the larger the concavity, the more pronounced is the small pixel effect.

The degree of concavity is also related to the position of the electron cloud relative to the anode. Thus, graph 154 typifies the graphs generated by clouds 124, 126, and 128. A graph 156 typifies the graph generated by electron cloud 130. Graph 154 is more concave than graph 156, since the electron clouds for graph 154 are generated near the edges of anodes 22A, 22B, 22C, and 22D, whereas the electron cloud for graph 156 is generated near the center of anode 22F. Graphs 154 and 156 are hereinbelow also termed anode graphs.

As described in more detail below, embodiments of the present invention measure energies of a photon impinging on assembly 10 by measuring the energies of all the interactions generated by the photon. To measure each interaction, assembly 10 initially determines that an interaction has occurred by detecting a charge change generated by the interaction. However, the time period before detection of an interaction at an anode is affected by the small pixel effect, as is demonstrated in graphs 152, 154, and 156. A detection level $Q_D$ is assumed to need to be reached by an interaction detector. If a cathode signal, corresponding to the cathode graph, is used to measure the interaction, the interaction detector requires a relatively short time period $\Delta T_1$ before detection of an interaction. If an anode signal, corresponding to an anode graph, is used to measure the interaction, the detector requires a relatively long time period, in a range between approximately $\Delta T_2$ and approximately $\Delta T_3$, before detection of the interaction. $\Delta T_2$ is the time taken for an anode generating a less pronounced small pixel effect to reach detection level $Q_D$, and $\Delta T_3$ is the time taken for an anode generating a more pronounced small pixel effect to reach the level. As demonstrated by graphs 154 and 156, the time period before detection increases as the concavity of the anode graph increases, i.e., as the small pixel effect becomes more pronounced.

Figure 4:
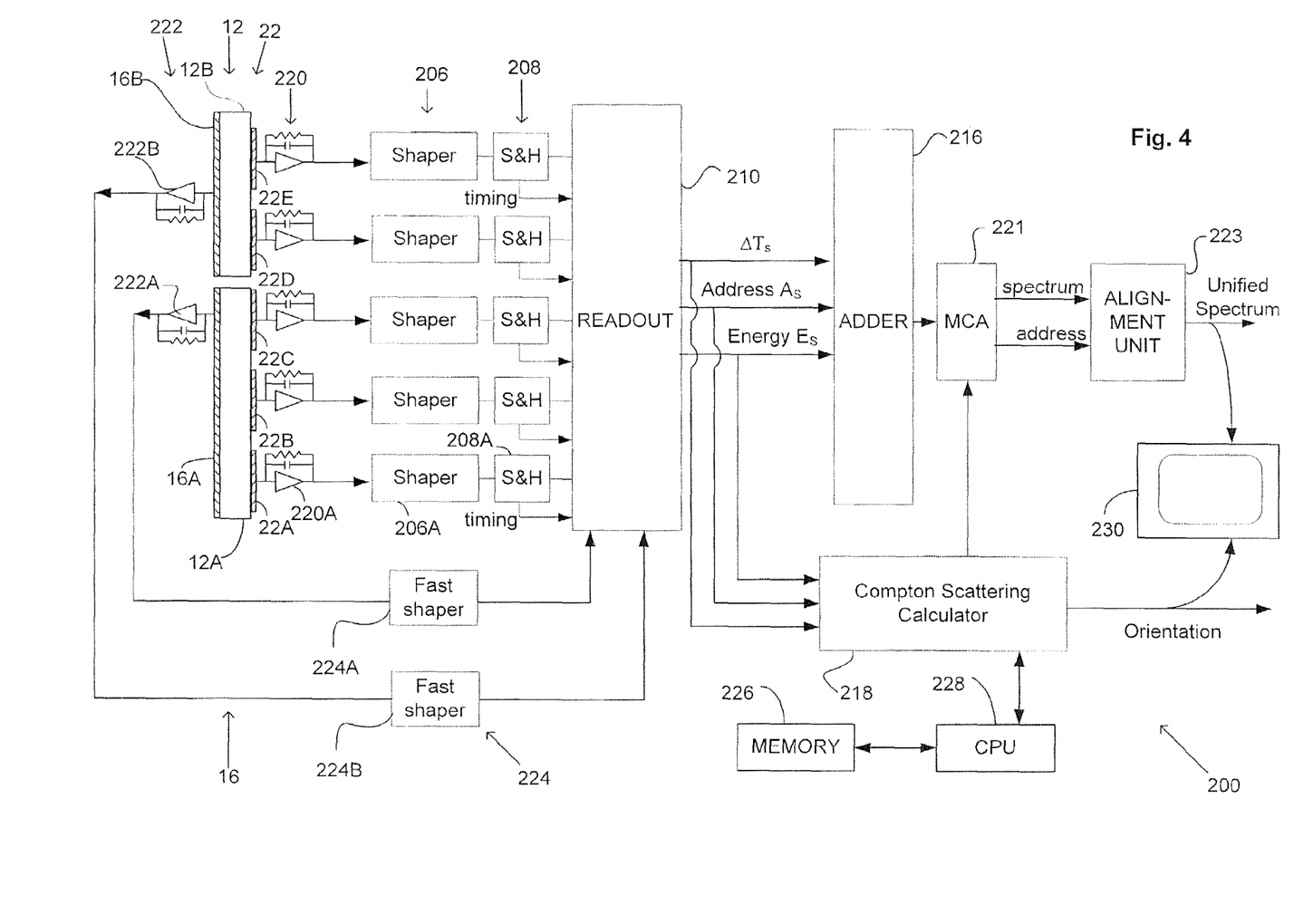
FIG. 4 is a schematic diagram of a circuit, according to an embodiment of the present invention.

FIG. 4 is a schematic diagram of a circuit 200, according to an embodiment of the present invention. Circuit 200 is typically incorporated in circuitry 24. (FIG. 1).

In circuit 200 all cathodes 16 of arrays 12 are coupled in a substantially similar manner. Each cathode 16 is coupled to a respective cathode CSA 222, and the output from each CSA 222 is coupled to a respective cathode fast shaper 224. The outputs of all cathode fast shapers 224 are used as a trigger for a readout circuit 210, to which the shapers are connected. By way of example, elements of circuit 200 coupled to cathode 16A of array 12A, and to cathode 16B of array 12B, are illustrated. Thus, cathode 16A is coupled via CSA 222A and shaper 224A to readout 210, and cathode 16B is also coupled via CSA 222B and shaper 224B to readout 210.

In circuit 200 all anodes 22 of arrays 12 are also coupled in a substantially similar manner. Each anode 22 is respectively coupled to a an anode CSA 220. The output of each CSA 220 is transferred via a respective anode shaper 206 to a sample and hold (S/H) circuit 208, so that the CSA, shaper, and S/H circuit act as a respective detector circuit for each anode 22. Each S/H circuit 208 measures a time that it receives a pulse output from its shaper 206, as well as a level of the pulse, herein also termed the pulse energy. The S/H circuit stores the measured energy and time of arrival of the energy until the energy value and time are read, as described below, by readout 210. By way of example, elements of circuit 200 coupled to anodes 22A, 22B, and 22C of array 12A, and to anodes 22D and 22E of array 12B, are illustrated. Thus, anode 22A is coupled via CSA 220A and anode shaper 206A to S/H circuit 208A. Circuit 208A is arranged to be able to transfer its level and timing data to readout 210.

Fast shapers 224 and shapers 206 act to filter signals from their respective CSAs so as to provide pulses having a shape more suited to following elements in circuit 200, as well as to increase the signal-to-noise ratio (SNR) of the pulses.

As described above, the interactions in a photon interaction group, of a photon with assembly 10, occur simultaneously. However, because of the different small pixel effects, the times at which the assembly is able to detect a particular interaction vary.

Embodiments of the present invention use the output of one or more cathode fast shapers 224, to determine a time at which a photon effectively begins interacting with assembly 10. The output of a given shaper 224 acts as a trigger signal to set readout circuit 210 into a read state, in which the circuit remains for a detection time period $\Delta T_R$, after which readout 210 reverts to a non-read state. In its read state readout 210 is able to read values from S/H circuits 208. An operator of assembly 10 sets the value of $\Delta T_R$ prior to operation of assembly 10. The value of $\Delta T_R$ is typically larger than time period $\Delta T_3$, where $\Delta T_3$ is the time period for an anode 22 to detect an interaction assuming a pronounced small pixel effect. The value of $\Delta T_R$ is typically mainly determined by a ratio between the dimensions of anodes 22 and a width of array 12. The value of $\Delta T_R$ is also related to a ratio of the area of an anode 22 to the area of cathode 16. Using these criteria, a specific value for $\Delta T_R$ may be determined by a person of ordinary skill in the art, without undue experimentation. Time period $\Delta T_3$ is illustrated on FIG. 3.

While in its read state, readout circuit 210 determines which S/H circuits 208 have energies waiting to be read. For each such S/H circuit, readout 210 reads the energy held by the S/H circuit, the time at which the S/H circuit registered the energy, and the address of the S/H circuit. Hereinbelow expressions $E_S$, $T_S$, and $A_S$ respectively denote the energy, time, and address, of a generic S/H circuit 208.

From the value of $T_S$, readout 210 determines a value of a delay time $\Delta T_S$, between readout 210 entering its read state and S/H circuit 208 registering its energy $E_S$, according to expression (1):

$$\Delta T_S = T_S - \Delta T_1 \quad (1)$$

where $\Delta T_1$ is the time at which cathode 16 detects an interaction.

Figure 5:
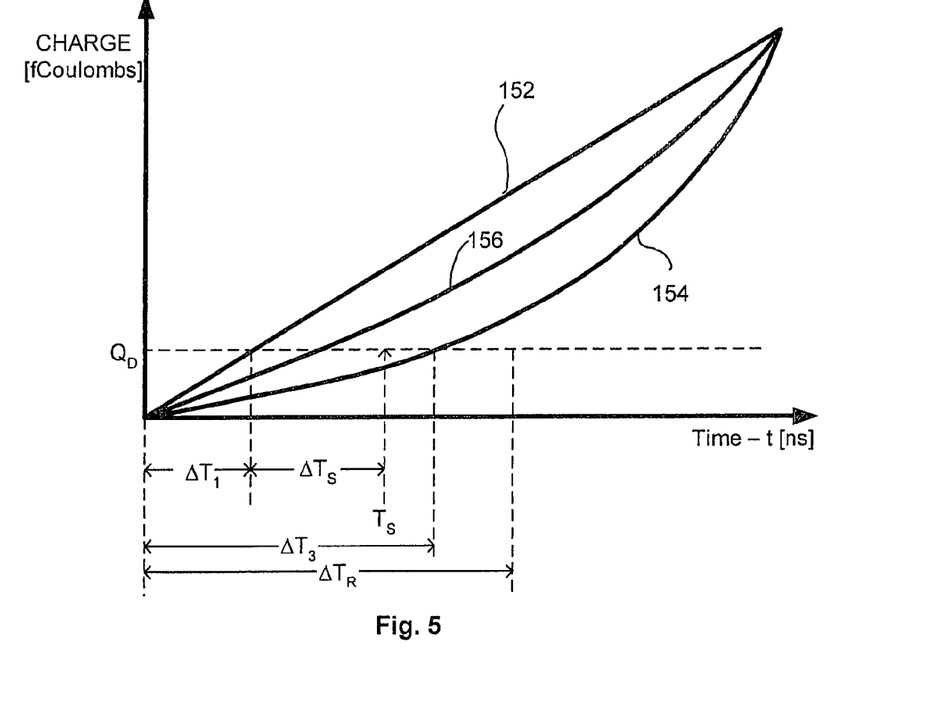
FIG. 5 schematically shows a relation between time periods occurring in the detector assemblies, according to an embodiment of the present invention.

FIG. 5 schematically shows the relation between times $\Delta T_S$, $\Delta T_R$, $\Delta T_1$, $T_S$, and $\Delta T_3$, according to an embodiment of the present invention. The times are shown in relation to the anode and cathode graphs of FIG. 3.

Returning to FIG. 4, for each S/H circuit 208 that is read, readout 210 conveys the values of $E_S$, $\Delta T_S$, and $A_S$ to a summing circuit 216, herein also termed adder 216. Adder 216 sums all energies $E_S$ with values of $\Delta T_S$ given by expression (2):

$$\Delta T_S \leq \Delta T_3 \tag{2}$$

By only summing energies from circuits satisfying expression (2), adder 216 ensures that the sum corresponds to the energy of the same single photon interacting with assembly 10, i.e., only to those energies of a photon interaction group. Adder 216 stores the resulting sum, $E_{SS}$, in a memory 226 in circuit 200, together with the addresses of the anodes supplying the energies.

Circuit 200 also comprises a Compton scattering calculator 218, which may typically be implemented in hardware, software stored in memory 226 and accessed by a computer processing unit (CPU) 228, or a combination of hardware and software. Calculator 218 determines, for a given photon interaction group, which address $A_S$ corresponds to the initial event of the group.

In order to perform its determination, calculator 218 uses the values of $E_S$ and $A_S$ used by adder 216 in summing the energies. A photon interaction group involving Compton scattering comprises two or more interactions, each interaction in the group typically occurring at a different address $A_S$. In a group comprising three interactions at three different addresses there are six possible paths, and in general, in a group comprising n interactions at n different addresses, where n is an integer equal to or greater than 2, there are n! different paths. However, only one of the paths has energies, and spatial parameters such as angular relationships between the paths, that satisfy the laws of conservation of energy, momentum, and the relations between the Compton scattering angle and the energy dissipated by the Compton scattering, that all apply to each interaction in the group. Methods are known in the art for determining the one correct path. For example, an article titled "Germanium Strip Detector Compton Telescope Using Three Dimensional Readout" by Wulf, et al., published in *IEEE Trans. Nuc. Sci.*, (2003), describes a method for finding the correct path for three interactions. The article is incorporated herein by reference. Other methods for finding the correct path will be apparent to those having ordinary skill in the art, and all such methods are assumed to be comprised in the present invention.

Knowledge of the correct path gives an address $A_{SI}$ for the initial address of the photon interaction group, the initial address corresponding to the location of the initial interaction.

A multi-channel analyzer (MCA) 221 receives the summed values $E_{SS}$ and the initial addresses $A_{SI}$, determined respectively by adder 216 and calculator 218. For each address $A_S$, i.e., channel of assembly 10, MCA 221 determines an energy distribution. The energy distribution of a given channel is the number of photons vs. energy of the photon for the channel. The energy distribution of a given channel is also herein termed the spectrum of the channel.

Figure 6A:
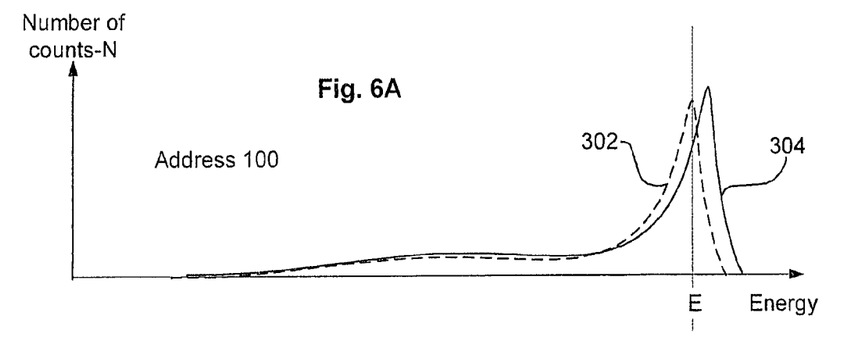
FIGS. 6A, 6B, and 6C show energy distributions generated the detector assemblies, according to an embodiment of the present invention.
Figure 6B:
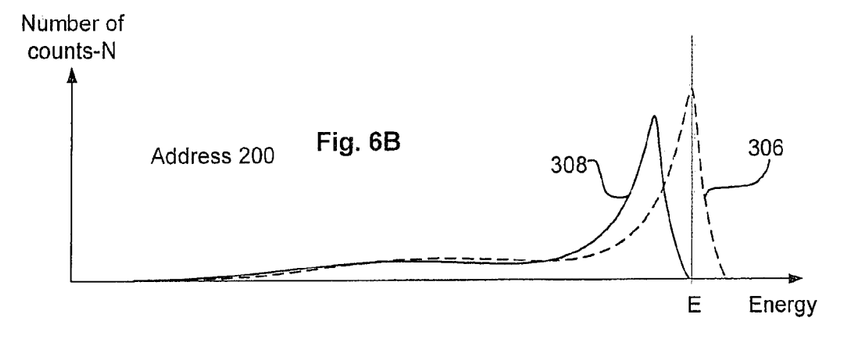
Figure 6C:
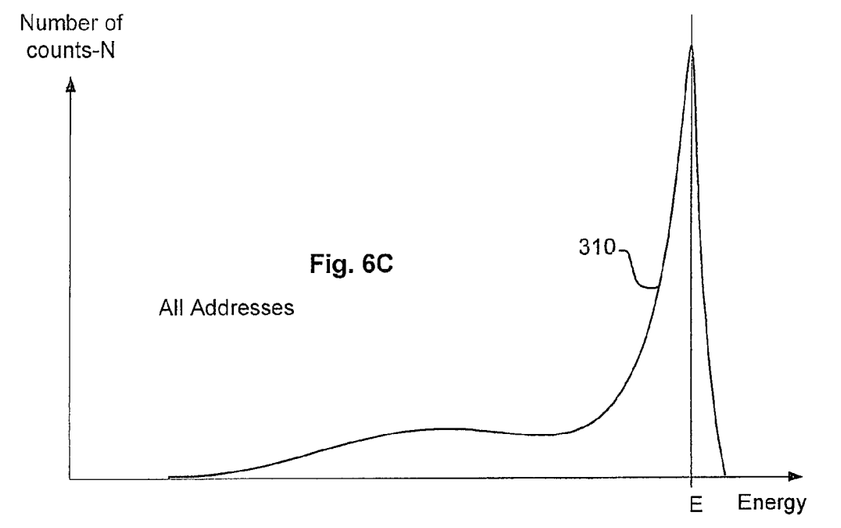

FIGS. 6A, 6B, and 6C show energy distributions generated by system 210, according to an embodiment of the present invention. A graph 304 in FIG. 6A and a graph 308 in FIG. 6B illustrate typical energy distributions for two exemplary addresses $A_S$, address 100 and address 200 respectively. The distributions are illustrative distributions output from MCA 221. FIG. 6C illustrates a resultant energy distribution 310, generated from the energy distributions of individual addresses $A_S$. The formation of distribution 310 is described below.

Figure 7:
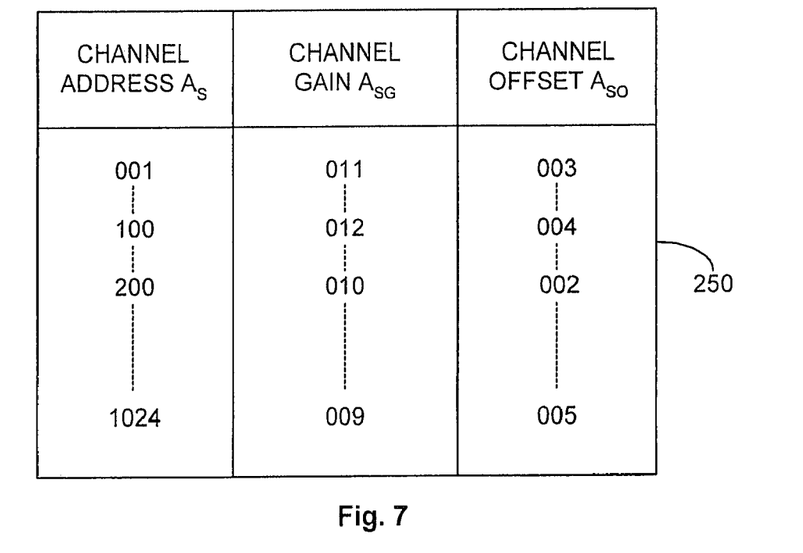
FIG. 7 is a schematic look-up table, according to an embodiment of the present invention.

FIG. 7 is a schematic look-up table 250, according to an embodiment of the present invention. Although nominally the same, the detector circuit associated with each anode 22, i.e., the anode's CSA 220, shaper 206, and S/H circuit 208, in practice has different gains and offsets. Thus, even if identical energy distributions are input to different addresses, the distributions output from the addresses are different. Embodiments of the present invention compensate for the variations in the detector circuit associated with each anode 22 by using look-up table 250, which comprises for each channel address $A_S$ a respective channel gain $A_{SG}$ and channel offset $A_{SO}$. Table 250 is typically generated prior to operation of assembly 10, using a known radioactive source, and the table is stored in memory 226.

Returning to FIG. 4, an alignment unit 223 receives each of the distributions formed by MCA 221, together with the addresses of the distributions. Unit 223 aligns the separate distributions by applying the gain and offset values of table 250 to each distribution, to form adjusted aligned distributions. Unit 223 sums the aligned distributions to form a unified resultant energy distribution.

The results of the alignment and summation described above are illustrated in FIGS. 6A, 6B, and 6C. Applying the values of gain $A_{SG}$ and offset $A_{SO}$, derived from table 250, for channel address 100, generates a realigned distribution 302 from distribution 304. Distribution 302 is assumed to have a peak count at energy E. Similarly, applying the values of table 250 for channel address 200 to distribution 308 generates a realigned distribution 306, which is also assumed to have a peak count at energy E. Distribution 310 is the sum of the realigned distributions of all channel addresses, and is also assumed to have a peak count at energy E. As explained above, distribution 310 is produced by unit 223, and may be displayed to an operator of assembly 10 on a display unit 230. Alternatively or additionally, distribution 310 may be provided in any other convenient form, such as in the form of a table, to the operator of the assembly.

As described above, assembly 10 finds the energy of an incoming photon by summing the energies of the group of interactions generated by the photon, and the assembly also aligns the energy distributions of the photons. The first process of energy summation ensures that the energy value calculated by the assembly is close to the actual energy value of the incoming photon. The second process of distribution realignment ensures that the energy distribution that is output from multiple anode assembly 10 effectively has an energy resolution equal to that of one anode. If assembly 10 corresponds to the disclosed embodiment referred to above, the assembly comprises a stack of eight arrays 12, each array having 256 anodes and approximate dimensions of 4 cm×4 cm×0.5 cm, so that the assembly is in the form of a cube of approximate edge 4 cm. This cube has 2048 voxels, the box-like volumes within the assembly defined by anodes, each voxel having dimensions of 0.25 cm×0.25 cm×0.5 cm. Such an assembly has an energy resolution substantially the same as one voxel defined by one anode 22, which has the voxel dimensions given above.

Figure 8:
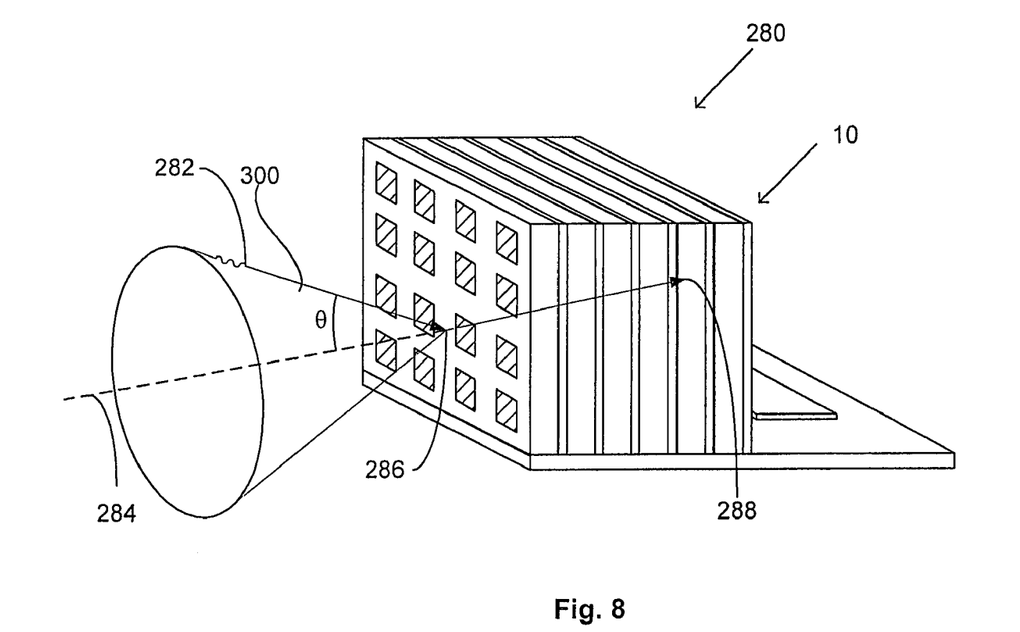
FIG. 8 is a schematic diagram illustrating Compton scattering of a photon by a radiation detector assembly, according to an embodiment of the present invention.

FIG. 8 is a schematic diagram 280 illustrating Compton scattering of a photon by assembly 10, according to an embodiment of the present invention. By way of example, diagram 280 illustrates two interactions of a photon 282 with assembly 10, at locations 286 and 288. From an analysis of the energy dissipated at each interaction and of a direction of the path between the interactions, an orientation of the incoming photon may be calculated. Similarly, for three or more interactions, providing that the energy dissipated at each interaction, and the direction of the path between the interactions are known, an orientation of the incoming photon may be calculated. The orientation of the incoming photon is not determined uniquely. Rather, the analysis described above determines an orientation angle θ of a cone 300 on which the incoming photon lies. An axis 284 of cone 300 includes the line between locations 286 and 288. Methods for determining the orientation are known in the art, and are described, for example, in the article by Wulf, et al. referenced above.

Returning to FIG. 4, for each interaction that calculator 218 analyzes to determine the incoming photon energy, the calculator is also configured to find the orientation angle of the photon. Thus, in addition to preparing an energy distribution of incoming photons, for each channel address assembly 10 is able to form an orientation distribution for the channel address, i.e., for each anode 22. Typically, CPU 228 receives the orientation angles for each address $A_S$ from calculator 218, and calculates the orientation distribution for the address. For a given address each orientation distribution corresponds to cones of different values of orientation angle θ, all cones for the given address having a common vertex at the anode 22 of the address. CPU 228 overlaps the orientation distributions from different addresses, and from the overlapping distributions finds where a relatively large number of cones overlap. The positions of the relatively large overlap correspond to locations where there is a high probability of a radioactive source occurring. In some embodiments of the present invention, CPU 228 presents an operator of assembly 10 with the high probability locations measured relative to the assembly, typically on display unit 230 which the operator monitors.

It will be appreciated that embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the, foregoing description and which are not disclosed in the prior art.

The invention claimed is:

1. Apparatus for detecting radiation, comprising;
    a multiplicity of planar detectors arranged in a stack so as to interact with photons of the radiation, each detector comprising:
        a semiconductor plate having first and second sides;
        a cathode coupled to the first side of the semiconductor plate;
        a plurality of anodes, which are coupled to the second side of the semiconductor plate in different respective locations and are configured to sense respective charge distributions in response to interactions of the photons with a region of the semiconductor plate in proximity to the respective locations;
        a cathode detector circuit, which is coupled to the cathode and is configured to output a timing pulse in response to each of the interactions;
        respective anode detector circuits, which are coupled to the anodes and are configured to output respective charge signals in response to the sensed charge distributions; and
    readout circuitry, which is coupled to receive the timing pulse from each cathode detector circuit, and which is configured, in response to receiving the timing pulse from the cathode detector circuit of any of the detectors, to receive the respective charge signals that are output by the anode detector circuits of all the detectors within a preset time period following receiving the timing pulse, and to output a signal indicative of an energy distribution of the interactions in response to the received output charge signals.

2. The apparatus according to claim 1, wherein the plurality of anodes are arranged in a two-dimensional matrix.

3. The apparatus according to claim 2, wherein the two-dimensional matrix and the cathode have equal surface areas.

4. The apparatus according to claim 1, wherein the preset time period is set in response to a ratio of an area of the cathode to an area of one of the anodes.

5. The apparatus according to claim 1, wherein the readout circuitry is configured to determine respective energies dissipated in the interactions of the photons, and to sum the energies to provide an energy of a given photon.

6. The apparatus according to claim 1, wherein the readout circuitry is configured to determine an initial interaction of the interactions, and to select one of the anodes in response to a location of the initial interaction.

7. The apparatus according to claim 1, wherein the readout circuitry is coupled to determine an orientation angle for a given photon measured with respect to the semiconductor plate, in response to spatial parameters and energies of a given interaction.

8. The apparatus according to claim 1, wherein the readout circuitry comprises a memory wherein are stored respective alignment parameters for each of the respective anode detector circuits, wherein the respective alignment parameters are determined in response to irradiation of the semiconductor plate with a known radiation source, and wherein the readout circuitry is configured to compensate for variations in detection characteristics of the respective anode detector circuits in response to the respective alignment parameters.

9. The apparatus according to claim 1, wherein the readout circuitry is configured so that an energy resolution of the signal is equal to a resolution of one of the anodes.

10. The apparatus according to claim 1, wherein the detectors are arranged within the stack to face one direction.

11. A method for detecting radiation, comprising;
    arranging a multiplicity of planar detectors in a stack so as to interact with photons of the radiation, each detector comprising:
        a semiconductor plate having first and second sides,
        a cathode coupled to the first side of the semiconductor plate,
        a plurality of anodes, which are coupled to the second side of the semiconductor plate in different respective locations and are configured to sense respective charge distributions in response to interactions of the photons with a region of the semiconductor plate in proximity to the respective locations,
        a cathode detector circuit, which is coupled to the cathode and is configured to output a timing pulse in response to each of the interactions,
        respective anode detector circuits, which are coupled to the anodes and are configured to output respective charge signals in response to the sensed charge distributions;
    coupling readout circuitry to the planar detectors to receive the timing pulse from each cathode detector circuit; and
    configuring the readout circuitry:
        to receive, in response to receiving the timing pulse from the cathode detector circuit of any of the detectors, the respective charge signals that are output by the anode detector circuits of all the detectors within a preset time period following receiving the timing pulse, and
        to output a signal indicative of an energy distribution of the interactions in response to the received output charge signals.

12. The method according to claim 11, wherein the plurality of anodes are arranged in a two-dimensional matrix.

13. The method according to claim 12, wherein the two-dimensional matrix and the cathode have equal surface areas.

14. The method according to claim 11, wherein the preset time period is set in response to a ratio of an area of the cathode to an area of one of the anodes.

15. The method according to claim 11, wherein the readout circuitry is configured to determine respective energies dissipated in the interactions of the photons, and to sum the energies to provide an energy of a given photon.

16. The method according to claim 11, wherein the readout circuitry is configured to determine an initial interaction of the interactions, and to select one of the anodes in response to a location of the initial interaction.

17. The method according to claim 11, wherein the readout circuitry is coupled to determine an orientation angle for a given photon measured with respect to the semiconductor plate, in response to spatial parameters and energies of a given interaction.

18. The method according to claim 11, wherein the readout circuitry comprises a memory wherein are stored respective alignment parameters for each of the respective anode detector circuits, wherein the respective alignment parameters are determined in response to irradiation of the semiconductor plate with a known radiation source, and wherein the readout circuitry is configured to compensate for variations in detection characteristics of the respective anode detector circuits in response to the respective alignment parameters.

19. The method according to claim 11, wherein the readout circuitry is configured so that an energy resolution of the signal is equal to a resolution of one of the anodes.

20. The method according to claim 11, wherein the detectors are arranged within the stack to face one direction.

* * * * *